July 21, 1942.  C. C. McCAIN  2,290,648
BISCUIT CUTTER
Filed May 29, 1941
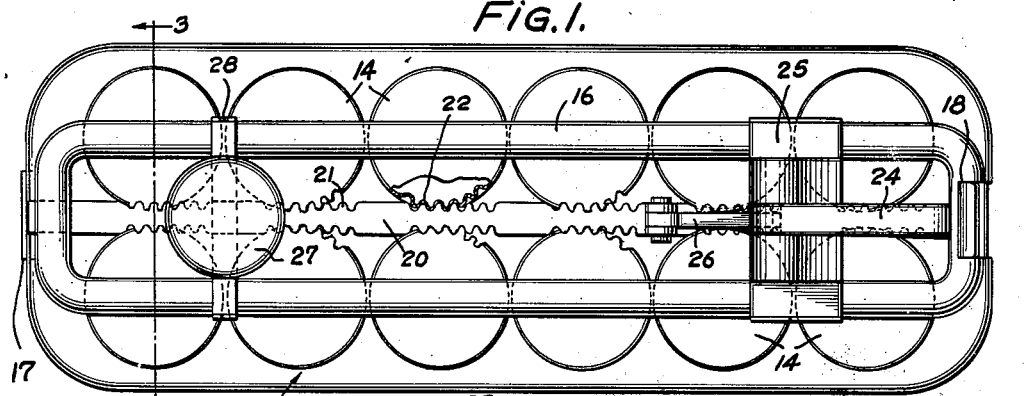
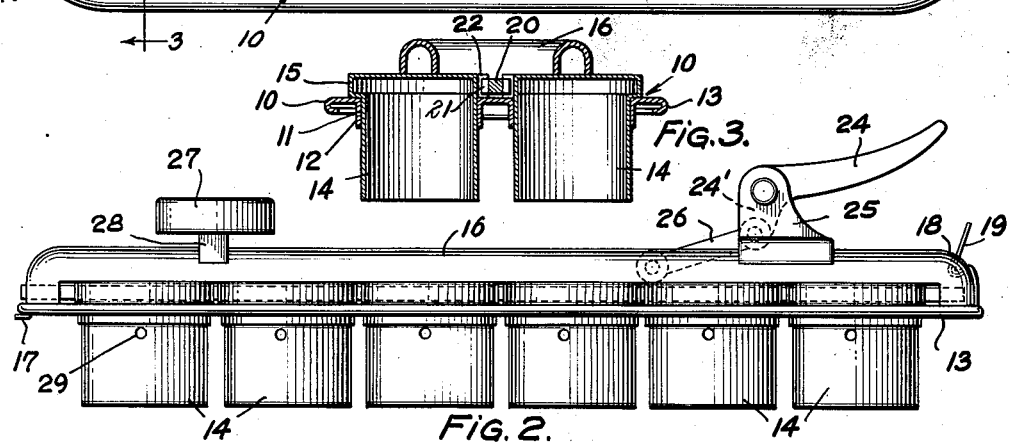
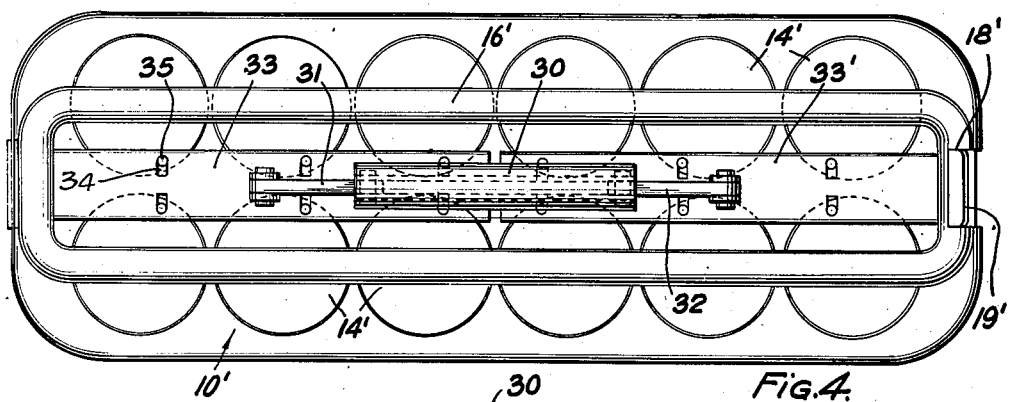
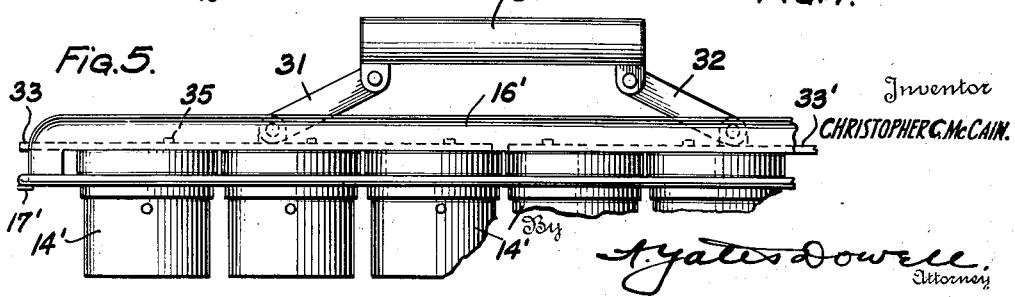
Inventor
CHRISTOPHER C. McCAIN.
By A. Yates Dowell
Attorney Patented July 21, 1942

2,290,648

UNITED STATES PATENT OFFICE 2,290,648

BISCUIT CUTTER

Christopher C. McCain, Washington, D. C.

Application May 29, 1941, Serial No. 395,868

10 Claims. (Cl. 30—301)

This invention relates to a device for cutting dough from a mass of suitable thickness for baking or cooking, known in the art as a biscuit cutter, and an object of the same is to provide a device of this character capable of making a plurality of cutting operations at one time in a manner such as to ensure complete severance of the dough pellets or shapes from the parent mass or layer. More specifically, the invention contemplates a biscuit cutter incorporating a gang of cutters movable in unison to effect complete severance of the dough by a direct cutting thrust terminating in an angular or limited rotary movement simulating the manual operation customarily employed by housewives, chefs and others in cutting biscuits preparatory to baking.

A further object is to provide a biscuit cutter particularly adapted for large scale baking of biscuits and like articles which is easy to operate, may be readily taken apart for cleaning and sterilization, and which is relatively light in weight and simple in construction while possessing the required amount of rigidity and strength.

The foregoing and other objects and advantages will become apparent in view of the following description taken in conjunction with the drawing, wherein:

Fig. 1 is a plan view of a biscuit cutter embodying the invention;

Fig. 2 is a side elevation;

Fig. 3 is a section taken on the line 3—3 of Fig. 1; and

Figs. 4 and 5 are respectively views in plan and side elevation of a modification in structure.

First referring to the form of cutter shown in Figs. 1, 2 and 3, a cutter-mounting frame is indicated at 10 and in its preferred form comprises a sheet metal member having at spaced points a series of annular holes 11 punched therethrough with the metal around the holes extended downwardly to provide bearing flanges or collars 12. The outer edge of the frame 10 is preferably formed with an inturned flange 13 to lend strength and rigidity thereto.

The cutters proper preferably comprise a series of sheet metal cylinders or cups 14, there being twelve in the present instance, each terminating at its bottom in a cutting edge. These cups are mounted in the openings 12 and have their upper ends expanded outwardly as at 15 to provide retaining and bearing portions.

Overlying the frame 10 with the cutters 14 disposed therein is a frame member 16 preferably of rolled sheet metal having a portion at one end extended downwardly and outwardly to provide a tongue 17 adapted to pass through a slot formed in the cutter-mounting frame 10 at this point, while the opposite end of the frame member 16 is formed with a detent 18 adapted to receive a spring latch 19 projecting upwardly from the frame 10. Thus the frame member 16 may be readily mounted in place simply by engaging the tongue 17 with its registering slot at one end and pressing the opposite end thereof downwardly until the latch 19 snaps into the detent 18.

The cutter-mounting frame 10 has its opposite end shaped to receive and support a rack bar 20 having a series of rack teeth 21 formed at spaced points therealong, said teeth being adapted to engage toothed segments 22 formed on each of the outwardly expanded upper ends 15 of the cutters 14. The teeth of the segments 22 are preferably formed by corrugating the metal in this region, not particularly Fig. 1. The opposite ends of the frame member 16 are undercut to receive the opposite ends of the rack bar 20 and serve as a guide for said bar.

A handle 24 shaped as a lever 24' at one end is pivotally mounted in a yoke-shaped bracket 25 secured to the frame member 16, said lever being connected by means of link 26 with the rack bar 20. By bearing down on the handle 24 the rack bar 20 is moved to the left as viewed in Figs. 1 and 2, and by raising the handle the said bar is pulled to the right. For convenience, another handle 27 is provided at the opposite end of the frame member 16 and is carried by a bracket 28 secured to said member.

To prevent entrapment of air within the cutters 14, the latter are vented as at 29, note Fig. 2.

In operation, a mass of dough is rolled out in the form of a layer of suitable thickness in the usual manner, and the cutter is placed over the layer and pressed downwardly. Approximately at the time the cutting stroke is terminated, the handle 24 is depressed to thereby impart a rotary movement to the cutters and ensure complete and final severance of the biscuit blanks or pelle s from the slab of dough. When the cutter is raised preparatory to cutting another group of biscuit blanks, the lever 24 is pulled upwardly, thereby returning the cutters to a position ready for a succeeding cut. Very little additional effort is required in actuating the handle 24 since it follows in the normal lowering and raising of the cutter to effect successive cuts from the parent mass of dough.

Whenever it is desired to take the cutter apart for cleaning purposes or sterilization, it is only necessary to release the latch 19, permitting the frame member 16 to be freed from the frame 10, whereupon the rack bar 20 and cutters 14 may be easily removed from said latter frame.

The entire unit may be made and sold at a relatively low cost.

In the modification shown in Figs. 4 and 5, parts which correspond to like parts in Figs. 1, 2 and 3 are given similar reference numerals with the exception that a prime (') has been added. In this instance, the cutter-carrying frame 10', cups 14' and frame member 16' may be made in substantially the same manner as corresponding parts heretofore described in connection with Figs. 1, 2 and 3.

The difference in this instance resides in the manner of imparting rotary movement to the cutters. A handle 30 is provided substantially centrally of the device and connects by means of links 31 and 32 with a split slide bar 33, 33' overlying the inner top portion of the cutters 14' and formed with a series of transverse slots 34 adapted to engage over pins 35 projecting from the tops of the cutters 14'. The bars 33, 33' which together constitute the actuator for the cutters are mounted for sliding movement in the frame 10' in a manner similar to the rack bar 20 of Figs. 1, 2 and 3, the movement being in opposite directions from the center of the device.

In operation, when the handle 30 is pressed downwardly to effect cutting of the dough, the bars 33, 33' are caused to move outwardly in opposite directions and effect rotary movement of the cutters 14'. When the handle is pulled upwardly to raise the cutter, the cups 14' are rotated to their normal position ready for a succeeding cutting operation.

The advantages inherent in the form of the cutter first described are also present in the modified structure. In both instances, a clean and complete severance is assured, the entire unit may be disassembled for efficient cleaning and sterilization, the parts may in the main be made of sheet metal or other suitable material at a low cost, and the device as a whole is relatively light in weight and may be operated with a minimum of manual effort.

It will be understood that certain limited changes in construction and design of the improved biscuit cutter as herein illustrated may be adopted at will without departing from the spirit or scope of the invention as defined by the appended claims.

What is claimed is:

1. A biscuit cutter comprising a cutter-carrying frame, a gang of cutters rotatably mounted in said frame, and means for effecting rotation of said cutters simultaneously with or at the termination of the cutting operation.

2. A dough cutting device comprising a cutter-carrying frame having a series of cutters rotatably mounted therein, a handle for said device, and means connecting said handle with said cutters for effecting rotation of the latter when downward pressure is exerted on the handle to ensure complete severance of blanks from a mass of dough.

3. Apparatus for cutting biscuits comprising a frame having a series of openings therein, a gang of cutters rotatably journaled in said openings, a frame member overlying said cutters, a slidable actuator connected to said cutters to effect rotation of the latter, and a handle lever connected to said actuator.

4. Apparatus for cutting biscuits from a mass of dough comprising a frame having a series of openings therein, a gang of hollow substantially cylindrical cutters journaled in said openings, an actuator bar slidably mounted in said frame, means providing an operative connection between said bar and cutters, and a handle connected to said bar for actuating the latter when the apparatus is pressed downwardly by the handle to rotate said cutters and effect complete severance of biscuit blanks.

5. A device for cutting biscuits from a slab of dough comprising a cutter-mounting frame, a series of substantially cylindrical hollow cutters journaled in said frame, a frame member detachably connected to the top of said first named frame and provided with a depressible handle, a slidable rack bar connected to said handle, said cutters and bar being formed with intermeshing teeth to provide a drive connection therebetween, whereby when the handle is depressed said cutters will be caused to rotate and effect complete severance of biscuit blanks.

6. A device for cutting biscuits from a slab of dough comprising a cutter-mounting frame having a series of openings formed therein, a gang of substantially cylindrical hollow cutters journaled in said openings, a frame member overlying said cutters and detachably connected to said first-named frame, a handle lever pivotally connected to said frame member, a rack bar pivotally connected to said handle lever to be actuated by the latter, said rack bar being formed with a series of teeth and said cutters being also formed with teeth in mesh with the teeth of the rack bar to provide an operative connection therebetween.

7. A device for cutting biscuits and the like from a slab of dough comprising a sheet metal cutter-mounting frame having a series of holes pressed therefrom with flanges around said holes, a gang of hollow sheet metal substantially cylindrical cutters journaled in said holes and having their upper ends expanded outwardly over said frame and formed with toothed segments, a frame member detachably connected to the cutter-mounting frame and provided with a pivotally mounted lever-shaped handle, a rack bar slidably mounted in said first-named frame and connected to said handle, said rack bar being provided with teeth in mesh with the teeth of said cutters and whereby when the handle is actuated rotary movement is imparted to the cutters.

8. A device for cutting biscuits comprising a frame having a series of hollow cutters journaled therein, a member overlying said cutters and detachably connected to said frame, a transversely split actuator bar slidably mounted in said frame and having an operative connection with said cutters, and a depressible handle mounted on said member and pivotally connected to said actuator bar whereby when the handle is depressed the said bar is spread and imparts rotary movement to said cutters.

9. A device for cutting biscuits from a slab of dough comprising a frame having a series of openings therein, a gang of substantially cylindrical cutters journaled in said openings, a member detachably connected to said frame and overlying said cutters, a transversely split actuator bar slidably mounted in said frame, a depressible handle pivotally connected to said bar, said bar and cutters being formed with interengaging slots and pins and whereby an operative connection is provided therebetween to effect rotation of the cutters when the handle is depressed.

10. A device for cutting biscuits from a mass of dough comprising a frame of sheet-like material formed with a series of openings having marginal flanges, a gang of hollow cylindrical cutters journaled in said openings and having their upper ends expanded outwardly around said openings, an actuator bar having its opposite ends slidably supported in guides formed in said frame, means providing a driving connection between said bar and the upper peripheral portions of the said cutters, a retainer member detachably connected to said frame and overlying said cutters, a depressible handle pivotally connected to said actuator bar for effecting movement of the latter and rotation of said cutters when the handle is depressed.

CHRISTOPHER C. McCAIN.